Feb. 6, 1923.
S. B. CLAY.
MACHINE FOR THREADING BOLTS AND PIPES.
FILED FEB. 2, 1920.
1,444,109.
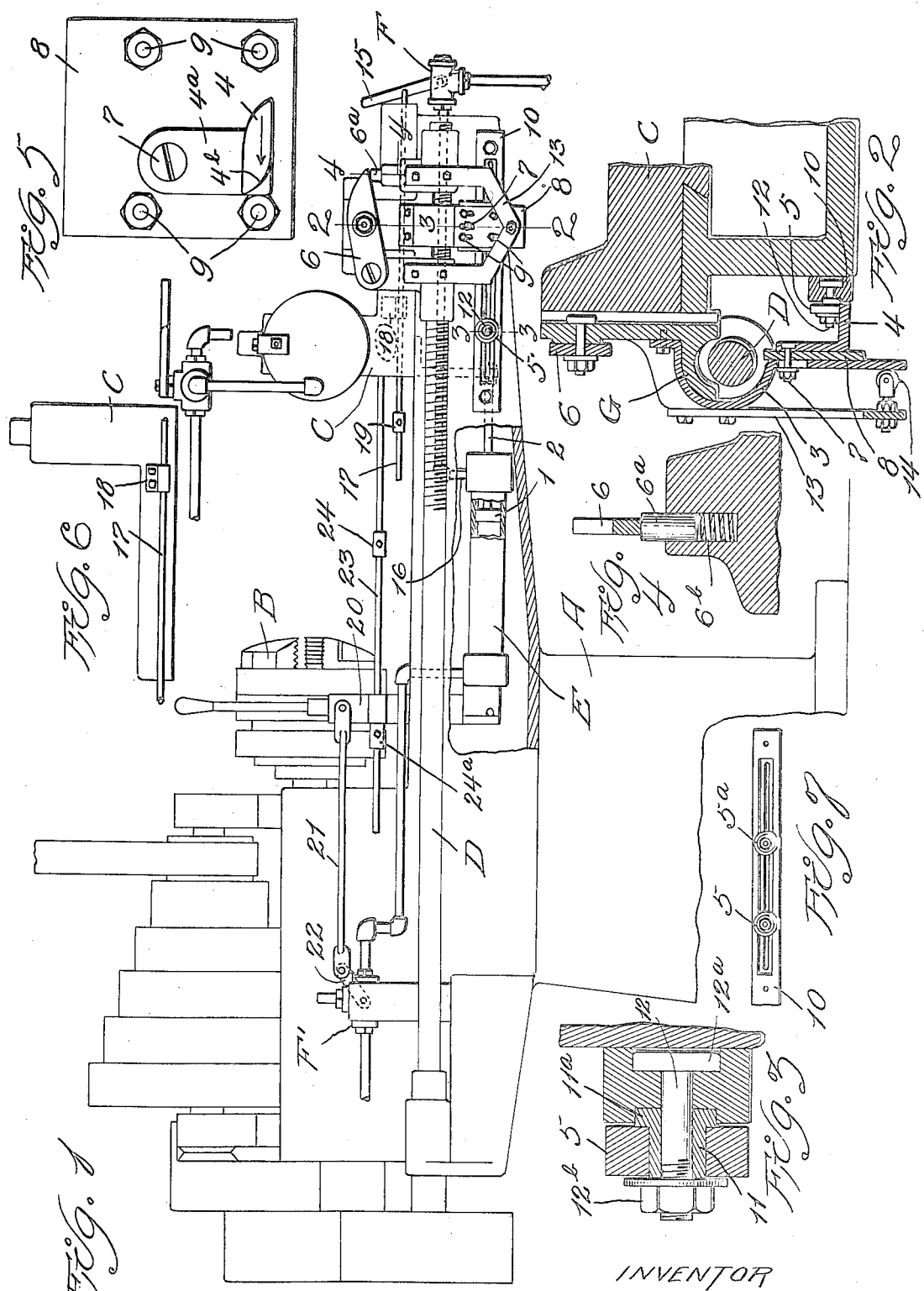
INVENTOR
SAMUEL B. CLAY,
by Bakewell Church, Attorneys.

Patented Feb. 6, 1923.

1,444,109

UNITED STATES PATENT OFFICE.

SAMUEL B. CLAY, OF ST. LOUIS, MISSOURI, ASSIGNOR OF ONE-HALF TO EDWARD R. FISH, OF WEBSTER GROVES, MISSOURI.

MACHINE FOR THREADING BOLTS AND PIPES.

Application filed February 2, 1920. Serial No. 355,704.

*To all whom it may concern:*

Be it known that I, SAMUEL B. CLAY, a citizen of the United States, residing at St. Louis, Missouri, have invented a certain new and useful Improvement in Machines for Threading Bolts and Pipes, of which the following is a full, clear, and exact description, such as will enable others skilled in the art to which it appertains to make and use the same.

This invention relates to machines of the kind that are used for threading bolts and pipes, and particularly, to threading machines of the type that are provided with a lead screw for moving the carriage to introduce the work into the threading mechanism and to feed the carriage while the threading mechanism is acting on the work.

The main object of my present invention is to provide a threading machine of the type referred to which is so designed that the cycle of the carriage can be started merely by opening a valve, the carriage operating mechanism being so constructed that the carriage will move quickly to carry the work into close proximity to the threading mechanism, and thereafter will be automatically connected with the lead screw that feeds the carriage during the threading operation.

Another object is to provide a threading machine in which the operating mechanism for the carriage is so constructed that it can be used for automatically feeding a bolt, pipe or other article which is to be provided with threads located at a number of separated points on the article. Other objects and desirable features of my invention will be hereinafter pointed out.

To this end I have devised a threading machine in which the carriage is moved to bring the work and the threading mechanism into close proximity with each other by a means operated by a medium under pressure, and during the operation of introducing the work into the threading mechanism and while said mechanism is acting on the work, said carriage is fed or moved by a lead screw which is automatically connected with the carriage just before the work has been engaged by the threading mechanism of the machine. The operating medium that actuates the means which moves the carriage to bring the work and threading mechanism into close proximity with each other is governed by a valve which closes automatically and cuts off the supply of the operating medium to said means after the carriage has reached a certain point in its travel, and the means which automatically connects the carriage with the lead screw consists of a nut or similar device on the carriage, normally spaced away from the lead screw, and means for automatically engaging said nut or device with the lead screw when the carriage reaches a certain point in its travel. In the machine herein illustrated means is provided for automatically returning the carriage to its starting position at the completion of the threading operation.

Figure 1 of the drawings is a side elevational view of a machine constructed in accordance with my invention for threading bolts, pipes and other articles.

Figure 2 is an enlarged vertical sectional view, taken on the line 2—2 of Figure 1.

Figure 3 is an enlarged vertical sectional view, taken on the line 3—3 of Figure 1.

Figure 4 is an enlarged detail sectional view, taken on the line 4—4 of Figure 1.

Figure 5 is an inside view of the plate on the carriage which carries the cam that effects the automatic engagement of the lead screw with the nut or co-operating device on the carriage.

Figure 6 is a side elevational view of a portion of the carriage, illustrating the device thereon which effects the closing of the valve that cuts off the supply of the operating medium which moves the carriage to position the work in proximity to the threading mechanism; and Figure 7 is a detail view, illustrating how the machine can be arranged or adjusted to automatically feed an article, such, for example, as a stay bolt blank which is to be provided with threads located at two separated points.

Referring to the drawings, which illustrate the preferred form of my invention embodied in a machine in which the work is mounted on a carriage that moves towards and away from the threading mechanism, A designates the base of the machine, B the threading mechanism and C the carriage on which the bolt, pipe or other article to be threaded is mounted, said carriage being provided with any preferred type of means for clamping the article in operative position thereon. The machine is provided with a lead screw D that feeds the carriage to introduce the work into the threading mechanism B, and while said threading mechanism is acting on the work, and a separate and distinct means is provided for moving the carriage to position the work in close proximity to the threading mechanism B and to restore the carriage to its starting position. In the machine herein illustrated the separate and distinct means just referred to consists of an operating cylinder E provided with a piston 1 whose rod 2 is connected to a depending arm or other portion on the carriage C. Compressed air or any other suitable operating medium is admitted to and exhausted from the front end (the right hand end) of the cylinder E by a three-way valve F arranged at the front end of the machine, and an independent valve F' is provided for admitting the operating medium to the opposite end or rear end of the cylinder E, so as to automatically restore the carriage C to its starting position.

During the threading operation the carriage C is moved or fed by the lead screw D which co-operates with a nut or other threaded device G on the carriage C that is normally spaced away from said lead screw, the nut G being moved automatically into engagement with the lead screw D just before the work on the carriage reaches the threading mechanism B. In the machine herein illustrated the nut G is carried by a vertically reciprocating member 3 which is depressed at a certain point in the path of travel of the carriage C by means of a cam 4 on said member that co-operates with a roller 5 mounted on a stationary part of the frame of the machine. As shown in Figures 1 and 2, the vertically reciprocating member 3 is arranged at the left hand side of the carriage C and is pivotally connected at its upper end to a lever 6 on the carriage whose free end is acted upon by a spring-pressed plunger 6ª that normally exerts pressure on said lever 6 in a direction to hold the member 3 in its elevated position so that the nut G thereon will be held out of engagement with the lead screw D, as shown in Figure 2, said plunger 6ª being moved upwardly by a coiled expansion spring 6ᵇ arranged under same, as shown in Figure 4.

The cam 4 previously referred to is disposed horizontally, as shown in Figure 2, and is provided with a vertically-disposed arm 4ª whose upper end is pivotally connected at 7 to a plate 8 arranged on the inner side of the vertically reciprocating member 3 at a point below the lead screw D. The plate 8 is preferably adjustably connected to the member 3 in such a manner that it can be raised and lowered slightly so as to adjust the cam 4 relatively to the roller 5 that co-operates with said cam to move the nut G downwardly into engagement with the lead screw D, this being effected in the machine herein illustrated by connecting the plate 8 to the member 3 by means of bolts 9 that pass through elongated slots in the member 3, as shown in Figure 1. The roller 5 is preferably adjustably mounted in a horizontally-disposed guideway 10 connected to a stationary part of the frame of the machine at a point below the guideway on which the carriage C travels, as shown in Figures 1 and 2. One convenient way of mounting the roller 5 is shown in Figure 3, wherein the roller 5 is illustrated as being rotatably mounted on a bearing 11 provided with a rectangularly shaped portion 11ª which fits in a horizontally disposed groove in the front side of the guide 10, said bearing 11 being held securely in adjusted position in the guide 10 by means of a bolt 12 provided with a rectangularly shaped head 12ª that fits in a groove on the rear side of the guide 10. The shank of the bolt 12 projects outwardly through a horizontally disposed, elongated slot in the guide 10; and the nut 12ᵇ that is mounted on the front end of said bolt serves to hold the roller 5 in operative position on its bearing 11 and also hold said bearing in adjusted position on the guide 10. In order to prevent the lower end portion of the member 3 from springing laterally when the cam 4 on said member engages the roller 5, I have provided the carriage with a depending yoke-shaped member 13 that is equipped at its lower end with a roller 14 which bears against the lower end portion of the vertically reciprocating member 3, as shown in Figure 2.

The valve F, previously referred to, is provided with a handle 15 that is adapted to be moved to the right, looking at Figure 1, so as to cause an operating medium to be admitted to the front end of the cylinder E through a supply pipe 16, thus causing the carriage C to start to move rearwardly or to the left so as to position the work on the carriage in close proximity to the threading mechanism B. Means is provided for automatically closing the valve F so as to cut off the supply of the operating medium to the cylinder E after the work on the carriage nearly reaches the threading mechanism B, the valve F being so constructed that when it closes it permits the operating medium previously admitted to the front end of the cylinder E to exhaust therefrom. In the form of my invention herein illustrated the means just referred to consists of a rod 17 that projects forwardly from the handle of the valve F through a guide 18 on the carriage C, as shown in full lines in Figure 6, and in broken lines in Figure 1, and an adjustable stop 19 on said rod that co-operates with the guide 18 on the carriage. During the movement of the carriage C towards the threading mechanism the guide 18 on said carriage engages the stop 19 on the rod 17, and thus moves the handle 15 of the valve F in such a manner that the operating medium being admitted to the front end of the cylinder E will be cut off after the work on the carriage has moved into close proximity to the threading mechanism B. Just before the valve F closes the cam 4 on the vertically reciprocating member 3 on the carriage engages the roller 5, thus causing the member 3 to move downwardly and bring the nut G into engagement with the lead screw D. The carriage C will now move to the left, under the influence of the lead screw D to introduce the work into the threading mechanism, the speed of the carriage being relatively slow as compared with the previous movement of the carriage to bring the work into position to cooperate with the threading mechanism. So long as the cam 4 remains in engagement with the roller 5 the nut G will remain in engagement with the lead screw D. As soon as the cam 4 moves out of engagement with the roller 5 the member 3 will move upwardly, thereby automatically disconnecting the carriage C from the lead screw D and permitting said carriage to return to its starting position under the influence of the operating medium admitted to the rear end (the left hand end) of the operating cylinder E by the valve F' previously referred to. Said valve F' is operated automatically by a mechanism consisting of a lever 20 connected by a link 21 to an arm 22 on the stem of the valve F', and a means for rocking said lever 20 first in a direction to open the valve F', and thereafter in a direction to close said valve and permit the operating medium previously admitted to the rear end of the cylinder E to exhaust therefrom. The means herein shown for operating the lever 20 consists of a rod 23 connected to the carriage C and provided with two stops 24 and 24ª. The stop 24 is so arranged that when the carriage C is moving rearwardly under the influence of the lead screw D said stop 24 will engage and move the lever 20, so as to cause the valve F' to open just after the cam 4 has passed out of engagement with the roller 5. Consequently, the carriage C will start on its return stroke immediately after the lead screw has been disconnected from said carriage. During the return stroke of the carriage to starting position, the stop 24ª engages and moves the lever 20 in the opposite direction so as to turn the stem of the valve F' in such a manner that the supply of the operating medium to the rear end of the cylinder E will be cut off when the carriage reaches its starting position, the operating medium that was previously admitted to the rear end of the cylinder E escaping therefrom as soon as the valve F' closes. During the return stroke of the carriage C the inclined surface 4ᵇ on the cam 4 (shown in Figure 5) strikes against the roller 5, and thus causes the arm 4ª to which said cam is connected to swing in such a direction that the cam will travel over the upper side of the roller 5, the upward movement of said arm 4ª being limited by the nut on one of the bolts 9 that connects the plate 8 to the vertically reciprocating member 3 and the downward movement or movement of said arm 4ª in the opposite direction being limited by the nut on one of the other bolts 9, the nut last referred to serving as a stop that prevents the cam 4 from moving when the inclined front end of said cam strikes the roller 5 during the forward stroke of the carriage C, namely, the stroke towards the threading mechanism.

One desirable feature of a threading machine of the construction above described is that it can be used for automatically feeding a bolt or other article which is to be provided with threads located at a number of separated points, such, for example, as a stay bolt. When the machine is used for this purpose, namely, for threading a stay bolt or other article consisting of a shank provided at separated points with enlarged portions on which threads are to be cut, the guide 10 is provided with two rollers 5 and 5ª, as shown in Figure 7, and the stop 19 on the rod 17 is arranged at such a point that the valve F will not close until after the cam 4 on the carriage has been engaged by the second roller 5ª. Assuming that the machine is used for threading a stay bolt, which, as is well known, is formed from a blank provided adjacent its ends with enlarged portions on which threads are to be cut, the blank is first arranged in operative position on the carriage C of the machine and the valve F is then manually opened so as to admit the operating medium to the front end of the cylinder E. The carriage will move quickly towards the threading mechanism, and when the cam 4 on the carriage engages the first roller 5, the nut G on the carriage will be automatically connected with the lead screw D, the valve F still remaining in its open position. When the cam 4 passes out of engagement with the first roller 5, the carriage will move quickly towards the threading mechanism under the influence of the pressure in the front end of the operating cylinder D, but after the carriage reaches such a position that the cam 4 engages the second roller 5ª, and causes the nut G on the carriage to be re-engaged with the lead screw D, the valve F will be closed automatically by the movement which the guide 18 on the carriage imparts to the rod 17 connected to the handle of the valve F. At the completion of the second threading operation, or after the cam 4 passes out of engagement with the second roller 5ª, the carriage is automatically returned to its starting position by the means previously described that effects the automatic operation of the valve F'.

While I have herein illustrated my invention embodied in a machine provided with means operated by a medium under pressure for moving the carriage towards and away from the threading mechanism, I do not wish it to be understood that my invention is limited to a machine of the particular construction herein illustrated, as it is immaterial, so far as my broad idea is concerned, what means is used for moving the carriage to position the work in close proximity to the threading mechanism and to restore the carriage to its starting position.

Having thus described my invention, what I claim as new and desire to secure by Letters Patent, is:

1. A machine provided with a reciprocating carriage, a lead screw, means independent of said lead screw for moving said carriage in one direction, and means for automatically connecting said carriage with said lead screw when the carriage reaches a certain point in its travel when moving in the direction referred to.

2. A machine provided with a carriage, a lead screw for feeding said carriage in one direction, an independent means for moving the carriage in the same direction, a device on the carriage that is adapted to cooperate with said lead screw for transmitting movement from the lead screw to the carriage, and means for automatically connecting said device and lead screw together when the carriage reaches a certain point in its path of travel while moving under the influence of said independent means.

3. A machine provided with a reciprocating carriage, means for moving said carriage in opposite directions, a lead screw separate and distinct from said carriage moving means, a nut on the carriage normally spaced away from said lead screw, and means for automatically engaging said nut with said lead screw and thereafter disengaging said nut from the lead screw when said carriage is moving into position to cause the work to be engaged by the means that acts on the work.

4. A threading machine provided with a threading mechanism, a carriage for supporting the article to be threaded, means adapted to be operated by a medium under pressure for moving the carriage towards said threading mechanism, a lead screw, and means whereby said carriage moving means will be rendered inoperative and the carriage will be automatically connected with the lead screw before the work on the carriage has been engaged by the threading mechanism.

5. A threading machine, comprising a threading mechanism, a carriage for supporting the article to be threaded, a lead screw, a nut on the carriage normally spaced away from said lead screw, means separate and distinct from the lead screw for moving the carriage towards the threading mechanism, and means rendered operative by the movement of the carriage for automatically moving said nut into engagement with said lead screw while the carriage is traveling towards the threading mechanism and for holding said nut and lead screw in engagement with each other during the threading operation.

6. A threading machine, comprising a threading mechanism, a carriage for supporting the article to be threaded, means adapted to be operated by a medium under pressure for moving the carriage towards said threading mechanism, a lead screw, a nut or device on the carriage that is adapted to co-operate with the lead screw to transmit movement from the lead screw to the carriage, a mechanism for moving said nut into and out of engagement with the lead screw, and a device arranged adjacent the path of travel of the carriage for automatically operating said mechanism.

7. A machine provided with a reciprocating carriage for supporting the work to be operated on, means for moving said carriage in opposite directions to carry the work into and out of engagement with the mechanism that acts on same, a lead screw separate and distinct from said carriage moving means, a nut on the carriage normally spaced away from the lead screw, means on the carriage for moving said nut towards and away from said lead screw, and a device arranged adjacent the path of travel of the carriage, that is at rest when the carriage is in motion, which co-operates with said means to cause the nut to be automatically engaged with the lead screw and held in engagement with same just before the work on the carriage has been engaged by the mechanism that operates on same.

8. A threading machine, comprising a threading mechanism, a reciprocating carriage that supports the article to be threaded, means adapted to be operated by a medium under pressure for moving the carriage towards the threading mechanism, a lead screw, means for automatically rendering said carriage moving means inoperative when the carriage reaches a certain position, and means for automatically connecting the carriage with the lead screw to cause the lead screw to feed the carriage during the threading operation.

9. A threading machine, comprising a threading mechanism, a carriage for supporting the article to be threaded, means adapted to be operated by a medium under pressure for moving the carriage towards the threading mechanism and for restoring the carriage to starting position after the threading operation, a lead screw, and means for automatically connecting up the carriage with the lead screw and for rendering said carriage moving means inoperative at a certain point in the path of travel of the carriage towards the threading mechanism.

10. A threading machine, comprising a threading mechanism, a carriage for supporting the article to be threaded, means adapted to be operated by a medium under pressure for moving the carriage towards said threading mechanism, a valve for governing the medium used to operate said means, means for automatically closing said valve at a certain point in the path of travel of the carriage towards the threading mechanism, a lead screw, means for automatically connecting the carriage with the lead screw so as to cause the carriage to move under the influence of the lead screw after said operating medium has been cut off, and means for automatically returning the carriage to its starting position at the termination of the threading operation.

11. A threading machine, comprising a threading mechanism, a carriage adapted to support an article that is to be threaded at a plurality of separated points, a lead screw, a nut on the carriage that is normally spaced away from said lead screw, means adapted to be operated by a medium under pressure for moving the carriage towards the threading mechanism, and an automatic means for causing the nut on the carriage to be engaged and disengaged from said lead screw a plurality of times during the stroke of the carriage towards said threading mechanism.

12. A machine provided with a movable carriage, a lead screw, a nut on the carriage that is adapted to co-operate with said lead screw, an actuating device for raising and lowering said nut into and out of engagement with the lead screw, a stationarily mounted roller arranged adjacent the path of travel of the carriage for operating said actuating device, and means separate and distinct from the lead screw for moving the carriage into a position to cause said actuating device to engage said roller.

13. A machine provided with a reciprocating carriage, a lead screw, a member on said carriage provided with a nut that is adapted to engage said lead screw, a resilient means that exerts pressure on said member to hold said nut out of engagement with said lead screw, and an adjustable means arranged adjacent the path of travel of the carriage that co-operates with a device on said member to move said member in a direction to carry the nut thereon into engagement with said lead screw.

14. A machine provided with a reciprocating carriage, a lead screw arranged at one side of said carriage, a vertically-reciprocating member on the carriage provided with a nut that is adapted to engage said lead screw, a spring-pressed lever that exerts pressure on said member in a direction to hold the nut thereon in an inoperative position, a pivotally-mounted cam mounted on the lower portion of said reciprocating member, a roller arranged adjacent the path of travel of the carriage and adapted to be engaged by said cam so as to automatically connect said nut with said lead screw, and means that acts on the lower portion of said reciprocating member to prevent it from springing or yielding when the cam thereon engages said roller.

15. A machine provided with a reciprocating carriage, a lead screw, a mechanism that is adapted to be actuated for establishing connection between said carriage and lead screw, means independent of said lead screw for moving the carriage longitudinally in one direction, and a plurality of devices arranged at separated points along the path of travel of the carriage for actuating said mechanism so as to cause the carriage to be engaged and disengaged from the lead screw a number of times in its path of travel.

SAMUEL B. CLAY.